Patented Feb. 27, 1940

2,191,587

UNITED STATES PATENT OFFICE 2,191,587

POLYETHER RESINS

Henry S. Rothrock, Wilmington, Del., assignor to E. I. du Pont de Nemours & Company, Wilmington, Del., a corporation of Delaware No Drawing. Application October 5, 1938, Serial No. 233,479

11 Claims. (Cl. 260—61)

This invention relates to resinous materials and more particularly to new and improved polyether resins obtained by reacting certain polyhydric phenols and organic polyhalides.

This case is a continuation-in-part of my application Serial No. 52,617, filed December 2, 1935.

In Patent 2,060,715 there is disclosed the preparation of a new class of resins described as ether resins. These resins are obtained by reacting polyhydric phenols, or certain of their metallic derivatives, with organic polyhalides whose halogen atoms are all attached to different aliphatic carbon atoms of a certain type.

Although the resins prepared in accordance with the patent just mentioned have valuable, and in many instances remarkable properties, their utility for some purposes has been restricted by their low softening points and by their non-thermohardening properties. In order to raise the softening points of these ether resins, it has been proposed in Patents 2,058,570 and 2,057,678 to use specific types of polyhydric phenols as intermediates in the synthesis of the resins. These phenols or intermediates are relatively expensive and not readily obtainable commercially. In addition, the resins described in these latter two patents have also the disadvantage of not being thermo-hardening.

An object of this invention is the preparation of new synthetic resins. A further object is a new process for making resins. A further object is the manufacture of a modified form of ether resin which is free from the disadvantages mentioned above. A still further object is the preparation of new synthetic resins which, although soluble in ordinary solvents, are relatively inert to chemical influences and which possess the property of becoming tough, insoluble and relatively high-softening upon short baking at about 100° C.

The above and other objects appearing hereinafter are accomplished by reacting certain preformed polyether resins in solution with small amounts of formaldehyde or similar aldehyde in the presence of a strong, non-oxidizing, inorganic acid catalyst.

The preparation of the polyether resins which form the starting material for the present invention is fully described in the above mentioned patents and is therefore but briefly referred to here. These synthetic resins, in which the new chemical union effected consists essentially of ether linkages, are the reaction products of substantially unpolymerizable polyhydric phenols and organic polyhalides, free of ester groups, whose halogen atoms are all attached to different carbon atoms which are in turn joined, by single bonds only, to at least one carbon, any valences not satisfied by carbon being satisfied by hydrogen. The halide is preferably a dihalide of the formula $X-(CH_2)_m-O-(CH_2)_n-X$, where X is a halogen and $m$ and $n$ are whole numbers greater than one. An example of a suitable phenol is di-(4-hydroxyphenyl)dimethylmethane, and a suitable polyhalide is $\beta, \beta'$-dichlorodiethyl ether. The resins are best made by condensing the alkali or alkaline earth metal polyhydric phenolate with the polyhalide.

The following is the preferred general method for making these resins: The polyhydric phenol is mixed with an aqueous solution of the theoretical or a slightly excess quantity of concentrated aqueous alkali and heated at a relatively high temperature, i. e., above 70° C. and preferably above 100° C., but below the decomposition temperatures of the ingredients, with a substantially chemically equivalent amount of the polyhalide. The apparatus preferably consists of a vessel fitted with a thermometer, reflux condenser, and a stirrer designed to sweep the sides and bottom of the vessel. Heating is continued until the desired state of condensation is obtained or until as much of the phenol and halide are reacted as possible. The phenol is largely reacted when the amount of acid to neutralize a definite sample becomes essentially constant; where the theoretical amount of alkali was used originally, the final product is nearly neutral. (This method of following the progress of the resinification, however, is sometimes only approximate since part of the alkali may be used up in the hydrolysis of the polyhalide, a side reaction which does not contribute to the resinification.) When the halide is volatile, tests can be made for uncombined halide by distilling a few drops from the reaction vessel. If this distillate is cloudy, some of the halide is uncombined and refluxing is continued. When the distillate is clear, the water can be distilled off without loss of halide; this will then permit the use of higher temperatures in the later stages of the reaction with a resultant decrease in time of preparation. Further heating after the distillate becomes clear is generally necessary inasmuch as this "clear" point only shows that essentially all the halide has been combined by the elimination of at least one of its halogen atoms, but not necessarily all of them. The final reaction mass is very viscous, also opaque because of occluded salt. When it has reached the desired consistency, the hot mass is poured into a steam-jacketed Werner-Pfleiderer type mixer and washed with small portions of dilute hydrochloric acid, and finally with water to remove the salt. The resin is then dried, either in vacuo or at atmospheric pressure, for several hours at temperatures above its melting point, e. g., in the range 100°–150° C. Clear, tough resins are obtained whose hardness will depend largely on the temperature, time of reaction, and certain other details.

In order to provide foci for reaction with aldehydes, it has been proposed, as disclosed in the above mentioned patent, to introduce into the ether resin a group, such as a sulfonamide group, known to be reactive with aldehydes. But the present discovery that, by the use of an acid catalyst of the type given above, ether resins in general, and not simply those containing groups of the mentioned type, will react with formaldehyde and yield thermo-hardening resins, has not previously been disclosed. The present process avoids the necessity of introducing extraneous groups which detract from the valuable properties characterizing the ether resins. The new feature of carrying out the reaction with formaldehyde in the presence of certain acid catalysts, therefore, presents the advantage of producing thermo-hardening resins from the more desirable ether resins which do not contain deleterious foreign groups. It is for this reason that the ether resins of all the examples given below, as will be seen from the chemical formula required by the compounds named, consist of carbon, hydrogen, and oxygen, the constituents of the most valuable of the straight or unmodified ether resins. The oxygen contained in these resins is singly bonded oxygen only.

The following resins are typical of those suitable for the practice of the present invention:

Di(4-hydroxyphenyl)dimethylmethane and $\beta,\beta'$-dichlorodiethyl ether

Di(4-hydroxyphenyl)dimethylmethane and $\beta,\beta'$-dichlorodiamyl ether

Di(3-methyl-4-hydroxyphenyl)dimethylmethane and ethylene dichloride 1,1-di(4-hydroxyphenyl)cyclohexane and $\beta,\beta'$-dichlorodiethyl ether Di-$\beta$-naphthol and $\beta,\beta'$-dichlorodiethyl ether Di-(4-hydroxyphenyl)naphthane-2 and $\beta,\beta'$-dichlorodiethyl ether Di(4-hydroxynaphthyl)dimethylmethane and $\beta,\beta'$-dichlorodiethyl ether Resorcinol and hexamethylenedibromide Di(4-hydroxyphenyldimethylmethane) and glycerol-$\alpha,\alpha'$-dichlorhydrin A resin useful in the practice of this invention may be made as indicated below:

| | Parts |
|---|---|
| Di(4-hydroxyphenyl)dimethylmethane (M. P. 157° C.) | 456 |
| Dichlorodiethyl ether | 286 |
| Water | 450 |
| Sodium hydroxide (50%) | 326 |

The above mixture is refluxed in an atmosphere of nitrogen or water vapor with stirring for 10 to 15 hours, or until a few drops of clear distillate shows that there is no remaining free halide. The water is distilled off over a period of 2 hours, the temperature finally being carried to 225°–230° C. and maintained at this point for 12 hours. The mass is now very viscous and pasty. It is poured while hot into a steam-jacketed Werner-Pfleiderer mixer, washed three times with water, then with small portions of dilute hydrochloric acid until the washings are acid to Congo red, and finally with water again until the washings are substantially free of chloride ion. The product is then dried by heating in vacuo at 120°–125° C. for 16 hours. The resin is clear, pale-colored and extremely tough, and is inert to acid, alkali, water and light. It is insoluble in alcohol and aliphatic hydrocarbons, but soluble in toluol, xylol and aromatic esters such as dibutyl phthalate. Films dry to a non-tacky condition in a very few minutes by simple evaporation of solvent; in this respect, the resin resembles cellulose derivatives. The resin does not mix readily with oils and most cellulose derivatives, but is compatible with benzyl cellulose. The resin does not heat-harden or dry by oxidation. It begins to soften at a comparatively low temperature, e. g., 40°–50° C.

The polyether resins may also be made by any of the processes described in the above mentioned patents, and with any of the polyhydric phenols and polyhalides mentioned in those patents. A particularly advantageous method consists in conducting the reaction in an alkaline medium to which an amine has been added as a catalyst.

As previously mentioned, the resins of this invention are obtained by interacting the polyether resins in solution with formaldehyde in the presence of an acid catalyst such as dry hydrogen chloride. Nitrogen may then be blown through the resulting solution of the reaction product to remove excess free hydrogen chloride. The resins thus prepared may be obtained in solid form by evaporation of the solvent, or they may be left in solution. In the preferred embodiment of the invention, the polyether resin is dissolved in a suitable solvent such as toluene, 1% (for example) of paraformaldehyde (based upon the weight of the resin) is added, the temperature is raised, for example, to about 85° C., and dry hydrogen chloride is bubbled into the solution, with stirring, to act as catalyst. The mixture is heated until reaction is complete, as judged by the attainment of the desired increase in viscosity. The reaction product is then cooled. If desired, traces of free hydrogen chloride remaining in the mixture may be removed by blowing the slightly warm solution with nitrogen.

The following examples are illustrative of the methods which may be used to carry out my invention.

*Example I*

Eleven hundred seventy-five (1175) grams of a 40% solution in toluene of the polyether resin prepared as described above were placed in a 2-liter flask equipped with a mercury seal stirrer, condenser, and inlet tube for HCl gas. The contents of the vessel were brought to about 95° C. and 4.7 grams (1%) of paraformaldehyde were added. Dry hydrogen chloride gas was then passed into the reaction vessel during a period of one-half hour. At the end of this time, the solution was cooled quickly in an ice bath, then blown with nitrogen for 1.5 hours to remove traces of HCl. The product was a clear homogeneous solution, very much more viscous than the original. Thus a 40% solution in toluene of the treated resin had a viscosity of about 98 poises as compared with 5 poises for the original solution. Films of the resin flowed on glass plates and air-dried for a short time, and then heated for 10 minutes at 125° C., were rendered insoluble in toluene. The softening point of the hardened films was about 65° C. as compared with 45° C. for the original resin. The dried films both before and after hardening were light-colored, tough, and flexible.

It will be observed from the above example that the resin prepared according to this invention was heat-hardening, and after hardening had a higher softening point than the non-heat-hardening polyether resin from which it was derived. It is to be noted that I employ the terms "hardenable," "heat-harden," etc., to mean that the softening temperature of the resin is appreciably increased by the application of heat, but not to mean that the resin is necessarily rendered convertible by heat to the infusible stage. In general, it is also true that the present formaldehyde treated resins on being heated not only have their softening temperature raised but are also converted to products insoluble in the usual organic solvents.

Aqueous formaldehyde instead of paraformaldehyde may be added to the polyether resin solution in the foregoing example. The catalyst may be any strong non-oxidizing inorganic acid, such as hydrochloric, sulfuric, hydrobromic, hydriodic, phosphoric, and the like. The acid may be anhydrous or not, but, if the latter, the reaction proceeds rather slowly unless, as indicated in the following examples, a blending agent such as glacial acetic acid is added to homogenize the solution containing formaldehyde, acid and resin.

*Example II*

One hundred (100) grams of a 40% solution in toluene of the polyether resin prepared as described above, 50 grams of glacial acetic acid, 3 grams of 37% aqueous formaldehyde solution, and 5 grams of concentrated hydrochloric acid were placed in a 500 cc. round bottom flask equipped with stirrer, etc., as in Example I, and the mixture was heated at about 90° C. with stirring for 1.5 hours. A cooled sample of the reaction mixture had much higher viscosity than that of the original mixture, and after two hours' heating the reaction mixture was a jelly-like mass. On evaporation of the solvent from the mixture, a clear resin was obtained, soluble in toluene. On baking the resin for 10 minutes at 120° C. the resin became insoluble in toluene.

*Example III*

One hundred (100) grams of a 40% toluene solution of the polyether resin used in Example II, 50 grams of glacial acetic acid, 3 grams of concentrated sulphuric acid, and 0.5 gram of paraformaldehyde were heated as described in Example II. After 5 minutes' heating at 90° C. the viscosity of the reaction mixture had increased greatly, and the mixture was cooled. A sample of the cooled mixture was heated in a vacuum oven for a few minutes to remove the acetic acid. The resin was found to be soluble in toluene but films of the solution dried at 120° C. for 5 minutes became insoluble in toluene.

The invention described herein is usually most satisfactorily carried out with formaldehyde in an amount of about 1% of the resin. As a rule, the amount of formaldehyde or paraformaldehyde used is from 0.01% to 10.0%. However, the ratio which can be used to produce soluble resins depends somewhat upon the duration of heating and upon other factors as well as upon the amount of formaldehyde. Thus, reaction mixtures containing the very small amounts of formaldehyde just mentioned will gel and the resulting resins will be insoluble if the heating is carried too far. On the other hand, larger amounts of formaldehyde can be used without producing insoluble resins if the reaction is allowed to proceed only a comparatively short time. Reaction mixtures containing 20% of formaldehyde (based on the weight of the body of the resin) gel, and the resin becomes insoluble very quickly. The insoluble heat-hardening resins thus made by using the larger amounts of formaldehyde or by using longer heating times are, however, useful for some purposes, such as molding.

Temperatures suitable for carrying out this invention cannot be set definitely because operable ranges will depend on the amount of formaldehyde employed, larger amounts of the latter requiring a lower temperature and time of treatment. As a rule, however, by properly adjusting the amount of formaldehyde and by proper selection of solvent it is generally possible to operate within the temperature range of 40°–100° C. Temperatures outside this range, however, are not precluded. For instance, it is possible by application of pressure and use of small amounts of formaldehyde (e. g., less than 1.0%) to operate at temperatures up to 140° C.

Various non-reactive solvents such as benzene, p-cymene, mesitylene, and xylene may replace wholly or in part the toluene of the examples. Mononuclear aromatic hydrocarbons are in general suitable. Pressures above atmospheric may be used.

Some of the formaldehyde-treated resins of this invention have a tendency to be converted to insoluble products even in solution at room temperature. Thus, if a resin prepared from dichlorodiethyl ether and 1,1-di(4-hydroxyphenyl)-cyclohexane, or a mixture of di(4-hydroxyphenyl)dimethylmethane therewith, is treated with formaldehyde as in Example I, the resulting resin solution thickens gradually even at room temperature, an insoluble gel being eventually formed. This effect is troublesome if it is desired to store the resin for any length of time. The difficulty may be avoided conveniently by the addition of small amounts of ammonia to the solution, preferably by passing in ammonia gas with stirring, or by shaking with aqueous ammonia. Other alkaline reagents may be used, for example, alkali carbonate solutions, gaseous methyl amine, etc. The action of the ammonia or other alkaline material in retarding the hardening process is probably due to neutralization of traces of acid catalyst.

Resins stabilized by ammonia as described are rendered permanently fusible and cannot be hardened even on extended baking at elevated temperatures. The stabilized resins still possess the improved softening point of the unstabilized resins, and the method thus offers a means for nullifying the heat-hardening properties of the formaldehyde-treated resins without loss of the valuable increase in softening temperature.

It is to be observed that the process for making the resins described herein has no relation to the phenol-aldehyde resin forming reaction. In the present instance the reaction for producing the initial ether resin is not one of the polymerization of a polymerizable phenol or phenol alcohol or other intermediate obtained by the interaction of phenol and aldehyde, but is the product obtained by the etherification of polyhydric phenols by certain polyhalides. Then, also, the present invention involves the reaction of a resin of the mentioned specific chemical constitution with formaldehyde, and not the reaction of phenols or of non-resinous bodies with aldehydes as is the case in the production of phenol-aldehyde resins. Furthermore, the products obtained by the practice of the present invention are wholly different in properties from the phenol-aldehyde resins. The resins of this invention are constituted largely of ether linkages and retain all the desirable properties of the ether resins in as much as the subsequent formaldehyde treatment does not detract from these properties and confers additional features of elevating the softening points and of producing hardenability. Additionally, the different nature of the present products and of the reaction involved in their manufacture is indicated by the very much smaller amounts of formaldehyde used in comparison with the amounts used in producing phenol-aldehyde condensations.

The resins prepared in accordance with this invention are applicable for a wide variety of uses. They have been used for coating tin cans and are highly successful as coating compositions over wood and steel. A valuable coating system for galvanized iron consists of an undercoat of the resin claimed herein and an oil type top coat as, for instance, one of a synthesized drying oil such as a polymer of divinylacetylene. These resins are also useful for coating paper, cloth, and other flexible sheet materials. They may be used for all purposes for which thermo-hardening resins are ordinarily used, and in this respect they possess a distinct advantage over the untreated polyether resins from which they are derived.

The process for preparing the resins described herein is highly advantageous in that it opens a simple new way to obtain high-softening, tough polyether resins, and in that it avoids the necessity of using the special types of relatively unavailable, expensive intermediates heretofore necessary to prepare polyether resins having such properties. It further opens a way readily to transform the thermoplastic resins described in the patents mentioned above into thermo-hardening resins of (when hardened) higher softening points, and makes it possible for these resins to compete with ordinary phenol-formaldehyde resins for many or all of the uses to which the latter may be put. All of these advantages are obtained without sacrificing the desirable properties of the original polyether resins, i. e., toughness, durability, chemical inertness, and resistance to light; properties which are by no means characteristic of the well known thermo-hardening phenolic or urea resins. For instance, the resins prepared according to this invention are tough, inert to chemical influences to a remarkable extent, and have the other desirable properties described in the mentioned patents. Since the resins claimed herein are heat-hardening and have a higher softening temperature and decreased solubility after baking, they have a broader field of usefulness than the untreated polyether resins from which they are derived. The resins described herein are then useful for purposes in which ordinary heat-hardening resins have hitherto been exclusively used. Yet the resins of this invention have, until they are heat-hardened, substantially the same desirable solubility characteristics as do the original polyether resins from which they are derived. The interaction of polyether resins with the amounts of formaldehyde described herein with the production of the marked differences in softening point and in thermo-hardening properties is quite remarkable. The simplicity and low cost of the present process are distinct advantages of this invention.

As many apparently widely different embodiments of this invention may be made without departing from the spirit and scope thereof, it is to be understood that I do not limit myself to the specific embodiments thereof except as defined in the appended claims.

I claim:

1. A process which comprises reacting with formaldehyde, in the presence of an acid catalyst, a thermoplastic resin consisting essentially of ether linkages until a thermo-hardening soluble resin having a softening point substantially higher than said thermoplastic resin is obtained, said thermoplastic ether resin consisting of carbon, hydrogen and oxygen and being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

2. A process which comprises reacting a thermoplastic resin consisting essentially of ether linkages with formaldehyde in the presence of an acid catalyst and in the presence of a mononuclear aromatic hydrocarbon solvent for the resin until a thermo-hardening soluble resin having a softening point substantially higher than said thermoplastic resin is obtained, said thermoplastic ether resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

3. A process which comprises reacting with formaldehyde, in the presence of gaseous hydrogen chloride, a thermoplastic resin consisting essentially of ether linkages until a thermohardening soluble resin having a softening point substantially higher than said thermoplastic resin is obtained, said thermoplastic ether resin being the reaction product of a susbtantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

4. A process which comprises reacting a thermoplastic resin consisting essentially of ether linkages with formaldehyde in the presence of hydrochloric acid and glacial acetic acid and in the presence of a mononuclear aromatic hydrocarbon solvent for the resin, said resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

5. The process set forth in claim 1 in which the formaldehyde is employed in an amount of 0.01% to 10% of said thermoplastic resin.

6. The process set forth in claim 1 in which the reacting of said thermoplastic resin and formaldehyde is at a temperature of 40° C. to 100° C.

7. A soluble thermo-hardening resin comprising the reaction product of formaldehyde with a thermoplastic resin consisting essentially of ether groups, said thermoplastic ether resin consisting of carbon, hydrogen and oxygen and being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

8. The process set forth in claim 1 in which said polyhalide is of the formula $$X.(CH_2)_m.O.(CH_2)_n.X$$

where X is halogen and $m$ and $n$ are greater than 1.

9. The soluble thermo-hardening resin set forth in claim 7 in which said polyhalide is of the formula $X.(CH_2)_m.O.(CH_2)_n.X$ where X is halogen and $m$ and $n$ are greater than 1.

10. The thermo-hardening product obtained by treating with ammonia the reaction product of formaldehyde in the presence of acid catalyst with a thermoplastic resin consisting essentially of ether linkages, said resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

11. A soluble thermo-hardening resin comprising the reaction product of formaldehyde in the presence of an acid catalyst with the thermoplastic resinous reaction product of di(4-hydroxyphenyl)dimethylmethane and dichlorodiethyl ether.

HENRY S. ROTHROCK.